United States Patent
Miyamoto

(10) Patent No.: US 7,224,818 B2
(45) Date of Patent: May 29, 2007

(54) IMAGE PROCESSING TO PREVENT FORGERY

(75) Inventor: Ryosuke Miyamoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 09/915,421

(22) Filed: Jul. 27, 2001

(65) Prior Publication Data

US 2002/0015511 A1 Feb. 7, 2002

(30) Foreign Application Priority Data

Jul. 31, 2000 (JP) ............................. 2000-231251

(51) Int. Cl.
*G06K 9/00* (2006.01)
(52) U.S. Cl. ...................... 382/100; 358/1.14
(58) Field of Classification Search ................ 382/100, 382/135, 137, 317, 311; 358/1.13, 1.14, 358/1.15, 3.28, 408, 442, 409, 526; 399/366, 399/8; 709/201, 203, 220, 221, 222
See application file for complete search history.

(56) References Cited

U.S. PATENT DOCUMENTS

| | | | | |
|---|---|---|---|---|
| 5,123,063 | A * | 6/1992 | Ohkubo | 382/318 |
| 5,390,003 | A * | 2/1995 | Yamaguchi et al. | 399/366 |
| 5,909,602 | A * | 6/1999 | Nakai et al. | 399/8 |
| 6,427,020 | B1 * | 7/2002 | Rhoads | 382/100 |
| 6,515,755 | B1 * | 2/2003 | Hasegawa | 358/1.14 |
| 6,628,417 | B1 * | 9/2003 | Naito et al. | 358/1.15 |
| 6,687,017 | B1 * | 2/2004 | Kakiuchi et al. | 358/1.14 |

OTHER PUBLICATIONS

U.S. Appl. No 09/628,023, filed Jul. 28, 2000.

* cited by examiner

*Primary Examiner*—Matthew C. Bella
*Assistant Examiner*—Tom Y. Lu
(74) *Attorney, Agent, or Firm*—Fitzpatrick, Cella, Harper & Scinto

(57) ABSTRACT

Control over processing of image data in a system comprising a plurality of scanning devices and a plurality of printing devices, each of which may or may not include a forgery-preventing function. An image processing apparatus receives information for each of the plurality of scanning devices and printing devices indicating whether or not they include a forgery-preventing function. When image data is received by the image processing apparatus, the image processing apparatus controls the processing of which printing apparatus the image data can be sent to for printing. If the image data is received from a scanning apparatus that includes a forgery-preventing function, the image data can be sent to any printing device, regardless of whether or not it includes a forgery-preventing function. If the image data is received from a scanning apparatus that does not include a forgery-preventing function, the image can be sent only to a printing device that does include a forgery-preventing function. Further, a display of available printers to which an operator can select to send the image data may be provided for, with the displayed available printers being controlled based on whether the image data is received from a scanning device that includes a forgery-preventing function or not.

51 Claims, 10 Drawing Sheets

| DEVICE NAME | FORGERY - PREVENTING FUNCTION |
|---|---|
| 101 SCANNER | ○ |
| 102 PRINTER | ○ |
| 103 SCANNER | × |
| 104 PRINTER | × |

FIG.8

WARNING

READING THIS ORIGINAL IS ILLEGAL

STOP READING

IMAGE PROCESSING TO PREVENT FORGERY

BACKGROUND OF THE INVENTION

1. Field of the Invention

The present invention relates to forgery prevention. More particularly, the present invention controls output of image data based on whether or not the image data is received from an image reading device that includes a forgery preventing function.

2. Description of the Related Art

Recently, the performance of color image readers that use CCD's or the like (for example, color scanners) and color printers has increased. As a result, the probability of making forgeries has increased by permitting the reading of copy-inhibited objects, such as bank notes and securities, with color scanners to generate image data, and outputting the image data to color printers to create a forged document.

However, when a personal computer (hereinafter, a PC) is used in connection with a color scanner and a color printer, a forgery-preventing device is more difficult to implement. In this regard, it is possible to implement a forgery-preventing device for all new scanners and printers. But, to do so for relatively inexpensive scanners and printers would significantly increase the price. Furthermore, if all new scanners and printers implement the forgery-preventing device, scanners or printers have already been sold do not have the forgery-preventing device. It is impossible to prevent using the scanner or printers have already been sold. To prohibit using the scanners or printers have already been sold decreases productivity.

Further, in a system in which color scanners and printers are connected via a network, it is difficult to offer a forgery-preventing function certainly and to know whether a scanned image or a printed image are performed with a forgery-preventing process or not.

SUMMARY OF THE INVENTION

The present invention addresses the foregoing by controlling the output of image data based on whether the image data is input from a device that includes a forgery-preventing function. According to the invention, forgery-preventing capability data is received from each of a plurality of image reading devices and image output devices. Image data read by one of the image reading devices is received and based on whether or not the image reading device includes a forgery-preventing capability, the image data is output to an appropriate image output device.

As a result, if image data includes security marks(such as electronic watermarks, etc.) and is read by a reading device that does not include a forgery-preventing capability, an output device which includes a forgery-preventing function is selected as the output device and printout of a forged document can be prevented. In contrast, if the image data includes security marks but is read by a reading device that includes a forgery-preventing capability, the image data will be analyzed and only printed if certain criteria are met, thus preventing printing of a forged document.

Thus, in one aspect the invention may be an image processing apparatus that communicates with a plurality of image reading devices and a plurality of image output devices, comprising first receiving means that receives forgery-preventing capability data from each of the plurality of image reading devices and a plurality of image output devices, second receiving means that receives image data read by one of the plurality of image reading devices, and controlling means that controls the image data to output the image data to an appropriate image output device based on whether or not the image reading device which read the image data includes a forgery-preventing capability.

One particular object of the present invention is to provide both high productivity and effect of forgery-preventing at the same time.

According to one aspect, the present invention, which achieves these objectives, relates to an image processing apparatus comprising first receiving means that receives information from a first scanning apparatus indicating the presence of a forgery-preventing function in the first scanning apparatus, and receiving information from a second scanning apparatus indicating the absence of a forgery-preventing function in the second scanning apparatus, second receiving means that receives information from a first printing apparatus indicating the presence of a forgery-preventing function in the first printing apparatus, and receiving information from a second printing apparatus indicating the absence of a forgery-preventing function in the second printing apparatus and controlling means that controls processing of image data received from one of the first or second scanning apparatuses to send the received image data to one of the first or second printing apparatuses based on the information received by the first receiving means and the information received by the second receiving means.

According to another aspect, the present invention, which achieves these objectives, relates to an image processing apparatus, comprising an interface unit arranged to receive information from a first scanning apparatus indicating the presence of a forgery-preventing function in the first scanning apparatus, to receive information from a second scanning apparatus indicating the absence of a forgery-preventing function in the second scanning apparatus, to receive information from a first printing apparatus indicating the presence of a forgery-preventing function in the first printing apparatus, and to receive information from a second printing apparatus indicating the absence of a forgery-preventing function in the second printing apparatus and a processor unit arranged to control processing of image data received from one of the first and second scanning apparatuses to send the received image data to one of the first or second printing apparatuses, based on the information received by the interface unit.

It is an important advantage of the present invention that the present invention can offer to both high productivity and effect of forgery-preventing at the same time.

According to another aspect, the present invention, which achieves these objectives, relates to an image processing apparatus, comprising first receiving means that receives information from a first scanning apparatus indicating the presence of a forgery-preventing function in the first scanning apparatus, and receiving information from a second scanning apparatus indicating the absence of a forgery-preventing function in the scanning apparatus, second receiving means that receives information from a first printing apparatus indicating the presence of a forgery-preventing function in the first printing apparatus, and receiving information from a second printing apparatus indicating the absence of a forgery-preventing function in the second printing apparatus, inputting means that inputs information related to a selected scanner apparatus for image scanning and notifying means that notifies a user, based on the information received by the first receiving means, the information received by the second receiving means, and the information input by the input means, of at least one available printing apparatus for which image data can be sent to for printing.

According to another aspect, the present invention, which achieves these objectives, relates to an image processing apparatus, comprising an interface unit arranged to receive information from a first scanning apparatus indicating the presence of a forgery-preventing function in the first scanning apparatus, to receive information from a second scanning apparatus indicating the absence of a forgery-preventing function in the second scanning apparatus, to receive information from a first printing apparatus indicating the presence of a forgery-preventing function in the first printing apparatus, and to receive information from a second printing apparatus indicating the absence of a forgery-preventing function in the second printing apparatus, a pointing unit arranged to indicate information related to a selected scanner apparatus for image scanning and, a display unit arranged to display, based on the information received by the interface unit and the information indicated by the pointing unit, at least one available printing apparatus for which image data can be sent to for printing.

It is an important advantage of the present invention that the present invention can offer to both high productivity and effect of forgery-preventing at the same time.

Other objects and advantages of the present invention will become apparent from the detailed description to follow taken in conjunction with the appended claims.

BRIEF DESCRIPTION OF THE DRAWINGS

FIG. 8 showing the warning displayed on display 311 of image controller 100 when a coincidence degree between the corrected image data and the specific image data in specific image memory 205 is higher than predetermined value.

DETAILED DESCRIPTION OF THE PREFERRED EMBODIMENTS

First Embodiment

Figure 1:
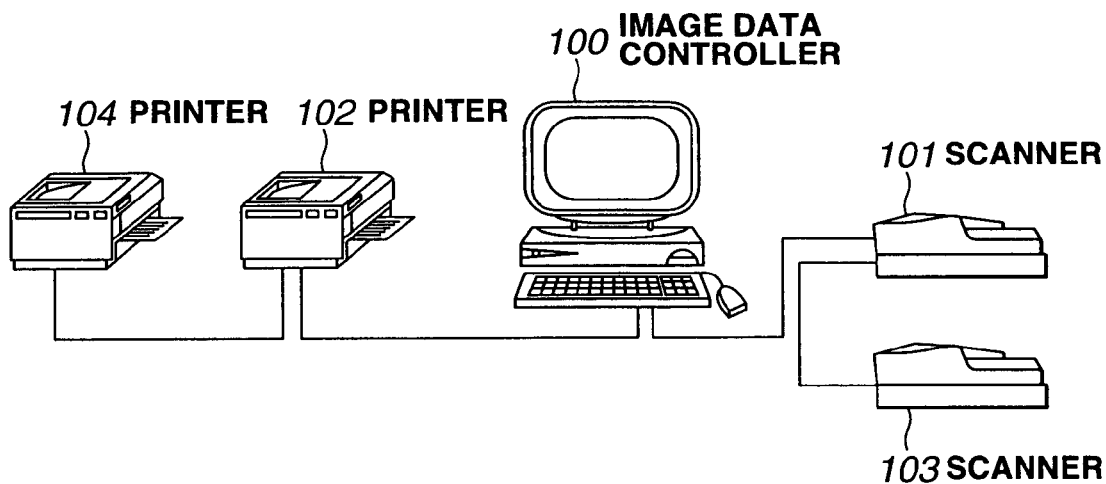
FIG. 1 is a diagram showing the configuration of an image processing system comprise an image information processing apparatus, an image reading apparatus and an image forming apparatus.

FIG. 1 is a diagram showing the configuration of an image processing system which may comprise an image information processing apparatus(such as a PC), an image reading apparatus(such as a scanner) and an image forming apparatus(such as a printer). Image data controller(PC) 100 is preferably a personal computer or a work station and performs input/output control of image data. Image scanners 101 and 103 read an original document and convert the read image data to an image signal. Printers 102 and 104 print an image based on image signals received form Image data controller (PC) 100. In FIG. 1, scanner 101 and printer 102 include forgery-preventing devices and scanner 103 and printer 104 do not include forgery-preventing devices. In FIG. 1, scanner 101 is directly connected to image data controller(PC) 100 and scanner 103 is connected to image data controller(PC) 100 via scanner 101. Printer 102 is directly connected to image data controller 100 and printer 104 is connected to image data controller 100 via printer 102.

Figure 2:
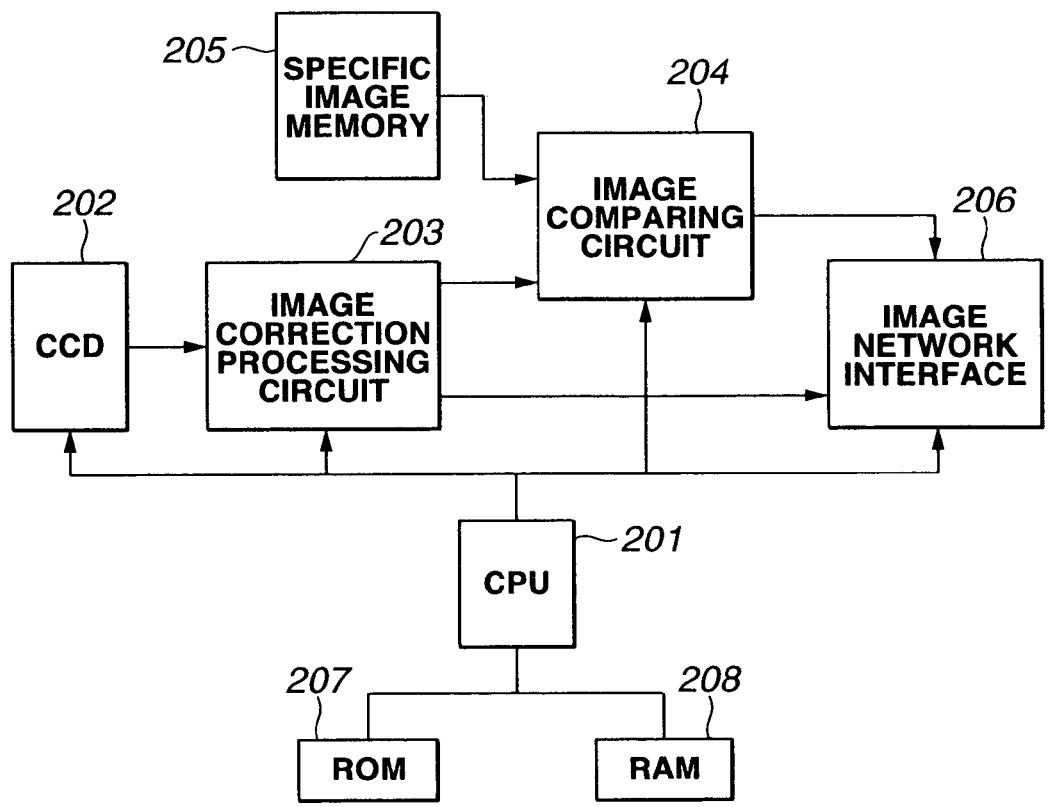
FIG. 2 is a block diagram to explain scanner 101 in FIG. 1.

FIG. 2 is a block diagram to explain an internal structure of scanner 101. CPU 201 controls scanner 101 based on a program stored in ROM 207 or some other unshown medium. CPU 201 controls an image signal processing circuit or an unshown optical system and an unshown mechanical system for reading processing. RAM 208 is used for a working area of CPU 201. Charge coupled device image sensor(hereinafter CCD) 202 coverts light based on an original document to an image signal. Image correction processing circuit 203 includes a shading correction processing circuit for compensating the dispersion of light distribution among a central part and end parts and a color space conversion processing circuit for converting a color signal having the color space characteristic of CCD 202 to color signals of a standard color space. Image comparing circuit 204 judges a coincidence degree between the corrected image data and specific image data to be described below. Specific image memory 205 stores the specific image data (which is image data of an original, for example bills and valuable securities in which the prevention of forgery is desired) for the image judgment by comparing circuit 204. The specific image data can be any data so long as the data is data for identifying a specific image. For example, if a specific image has a specific pattern, the specific image data is information of expressing the specific pattern, and if the specific image has a digital water mark, the specific image data is information of expressing the digital water mark. A digital water mark is a known technology of adding information to a specific frequency in an image and is a suitable method for adding information so as not to be seen by the naked eye. Image network interface 206 transfers data to image data controller(PC) 100. The judging result of image comparing circuit 204 and the corrected image data are transferred by image network interface 206 to PC 100.

Scanner 103 has the same configuration as scanner 101 with the exception of specific image memory 205 and image comparing circuit 204. That is, scanner 103 does not include a forgery capability and therefore omits memory 205 and comparing circuit 204.

Figure 3:
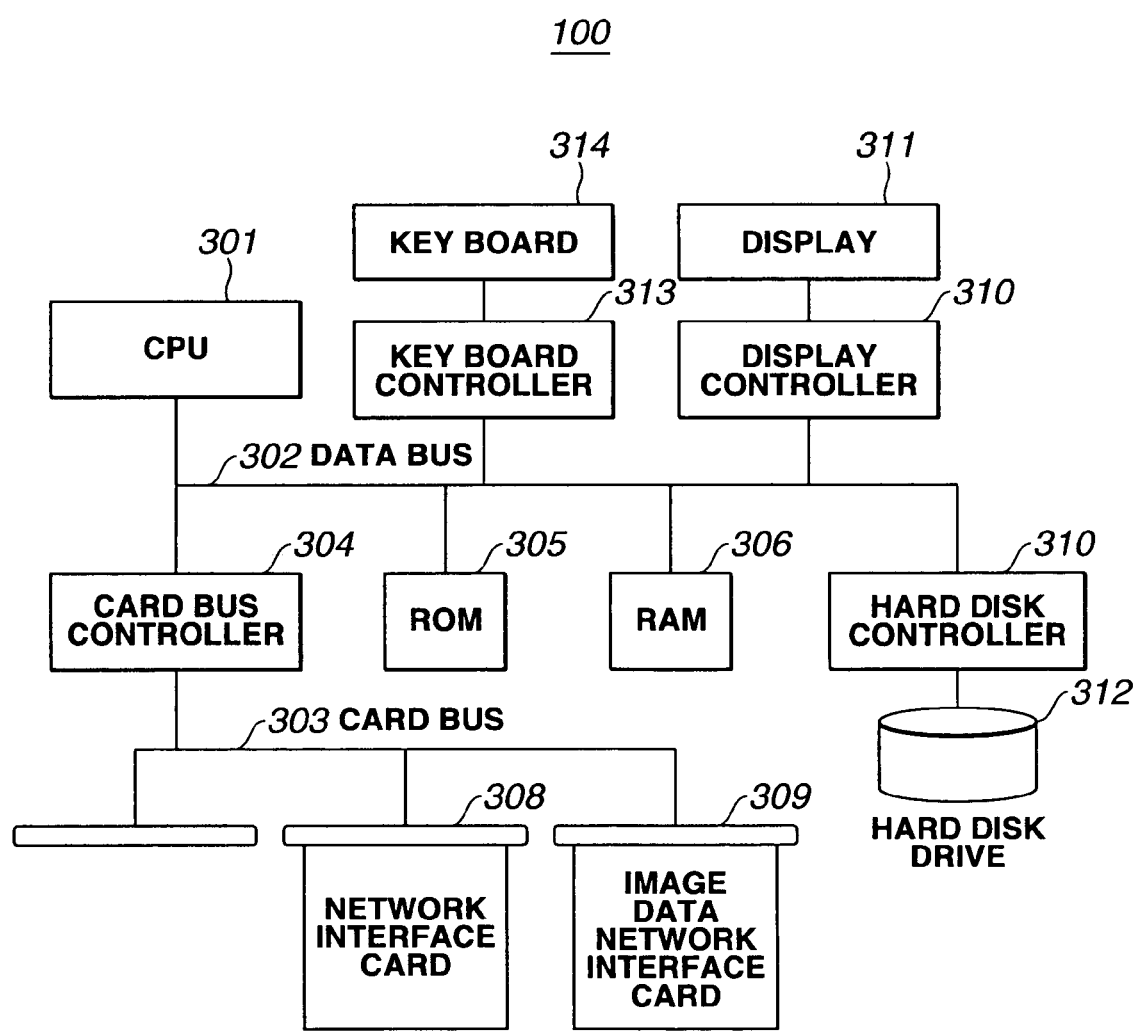
FIG. 3 is a block diagram of the image data controller 100.

FIG. 3 is a block diagram of the image data controller(PC) 100. CPU 301 in the image data controller(PC) 100 performs the input/output control of data with scanners 101 and 103 and printers 102 and 104. Data bus 302 is a data bus between CPU 301, card bus controller 304, ROM 305, RAM 306, hard disk controller 307, keyboard controller 313 and display controller 310, which are described later, and are all connected to data bus 302. Card bus controller 304 controls card bus 303 for inserting a function board for adding a function to image data controller(PC) 100. ROM 305 is a program memory where control software for image data controller(PC) 100 is stored. RAM 306 is configured by DRAM (Dynamic RAM) or SRAM (Static RAM), is used as a work area for application programs and can also be used as image data memory. Hard disk controller 307 performs read/write control of hard disk drive 312. Hard disk drive 312 is used for storing image data and program software. Hard disk controller 307 may also compress data when needed for storing image data and may also expand the data when needed for reading image data.

Next, each functional board connected to card bus 303 will be described. Network interface card 308 interfaces to a network that is unshown. This is configured such that a card corresponding to a physical interface to a network such as an Ethernet network and a token-ring network can be installed. Image data network interface card 309 is a network interface for transferring image data between image data controller (PC) 100 and scanners 101 and 103 and printers 102 and 104 in FIG. 1. It is preferable to configure image data network interface 309 with a high-speed bus such that a large volume of image data can be transferred, such as IEEE 1394 and USB (Universal Serial Bus). Display 311 is connected to a display controller 310 which controls image output to display 311. Keyboard 314 is connected to keyboard controller 313 that controls input from devices like keyboard 314, a mouse (unshown) or a truck ball (unshown). In the image processing system, a user instructs the reading of an original document or a printing operation by using a device such as keyboard 314 and a mouse (unshown) on display 311.

Figure 4:
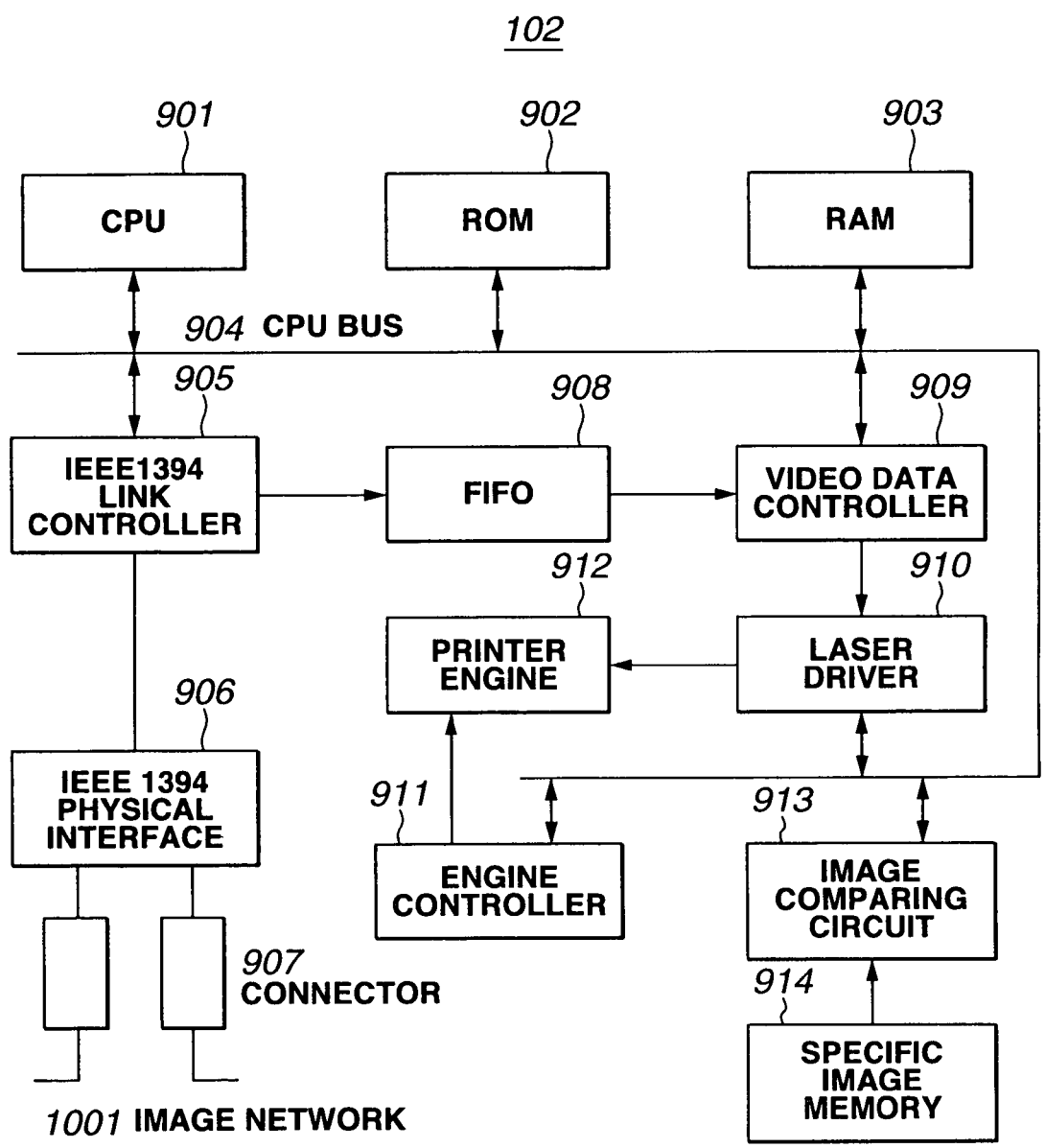
FIG. 4 is a block diagram of printer 102.

FIG. 4 is a block diagram of an internal architecture of printer 102. CPU 901 controls printer 102, such as mechanical control of printer 102 and reception of data. ROM 902 stores programs performed by CPU 901. RAM 903 is used for a work area of CPU 901 and CPU address and data bus 904 are lines for transferring address data and image data. IEEE 1394 link controller 905 interfaces with image network 1001. IEEE 1394 link controller 905 is connected to IEEE 1394 physical interface. First-In-First-Out memory (hereinafter, FIFO) 908 temporarily stores image data transferred by isochronous transfer to printer 102 and attached judging result information. Video data controller 909 controls reading of the image data from FIFO 908, synchronizing with the timing of an engine of printer 102. The attached judging information (judging information attached to the image data) separates from the image data and is sent to RAM 903. On the other hand, the image data (bitmap data) is sent to laser driver 910. Laser driver 910 is used for print processes and engine controller 911 performs mechanical control, such as a motor of printer engine 912 and a paper supply control.

Image comparing circuit 913 judges a coincidence degree between the image data, input in the printer, and specific image data such as stored data in specific image memory 914. The specific image data is similar to that described above and can be any data so long as the data is data for identifying a specific image like bills or valuable securities. For example, if the specific image has a specific pattern, the specific image data is information of expressing the specific pattern, and if the specific image has a digital water mark, the specific image data is information of expressing the digital water mark. Specific image memory 914 is a memory to store the specific image data for the judging.

Printer 104 has the same configuration as printer 102 with the exception of specific image memory 914 and image comparing circuit 913. That is, printer 104 does not include a forgery-preventing capability and therefore, memory 914 and comparing circuit 913 are omitted.

Scanners 101 and 103 and printers 102 and 104 are connected with image data controller(PC) 100 communicably via a network as shown in FIGS. 1, 2, 3 and 4. For example, the apparatuses can be communicably connected via an ordinary network like an Ethernet or via an interface such as USB, Centronics parallel interface or SCCI.

Next, the operation of an image processing system comprising image data controller(PC) 100, scanners 101 and 103 and printers 102 and 104 will be described with reference to FIGS. 5 to 10. At first, a process sequence of image controller(PC) 100 for confirming that scanners or printers connected to the network have forgery-preventing functions will be explained.

Figures 5, 6:
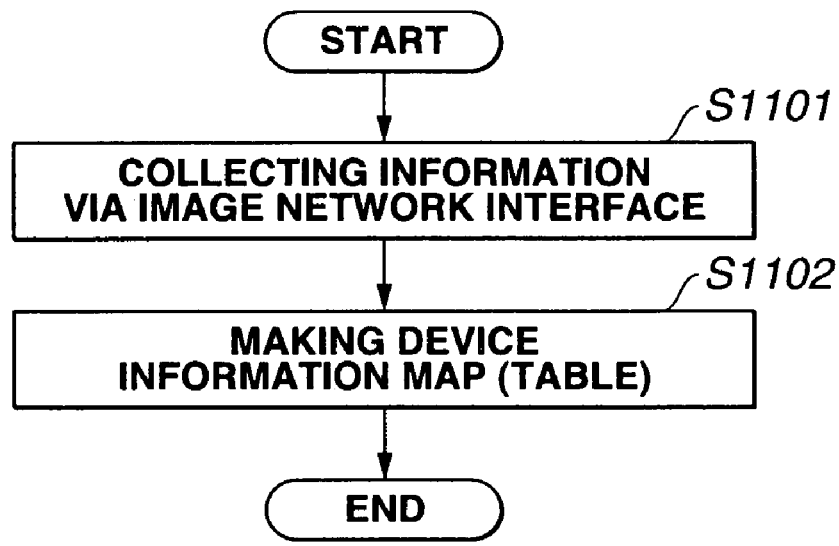
FIG. 5 is a flowchart that shows an example of the first control processing sequence of the image processing system.
FIG. 6 shows an example of the device information map (table).

FIG. 5 is a flowchart of process steps for a first control processing sequence of the image processing system seen in FIG. 1. Briefly, FIG. 5 shows a process performed by image controller(PC) 100 for confirming whether scanners or printers connected to the network have forgery-preventing functions. The process is performed by running programs in ROM 305, hard disk 312 or other storage medium (unshown) under the control CPU 301 in FIG. 3.

In step 1101, image data controller(PC) 100 collects information on devices (scanners 101 and 103 and printers 102 and 104) connected to the network via image network interface card 309 in step 1101. More particularly, image data controller 100 requests that each of the devices connected to the network transfer information indicating whether each of the devices includes a forgery-preventing function. In response to the request, the devices send information indicating whether they have a forgery-preventing function to image network interface card 309 of image data controller(PC) 100. If the devices do not respond to the request from image data controller 100 for predetermined time, they may be judged as not having the forgery-preventing function.

In step 1102, image data controller(PC) 100 generates a device information map (table) as seen in FIG. 6 (described later) based on the information. As will be described below, image data controller(PC) 100 controls the communication of image data to printers on the network by referring to this table. Image data controller 100 generates or rewrites the information map when image data controller 100 is turned on, whenever at least one of the devices is changed, whenever the devices receive a scanning or print indication from image controller 100 or when a new device is connected to the network. Image data controller 100 can therefore check whether each scanner and each printer connected to the network has the forgery-preventing function in advance of performing an image process.

FIG. 6 shows an example of the device information map (table). The device information map holds name information of each device and information indicating whether each device has the forgery-preventing function or not. The device information map is preferably stored in RAM 306 or hard disk 312 in FIG. 3.

Figure 7:
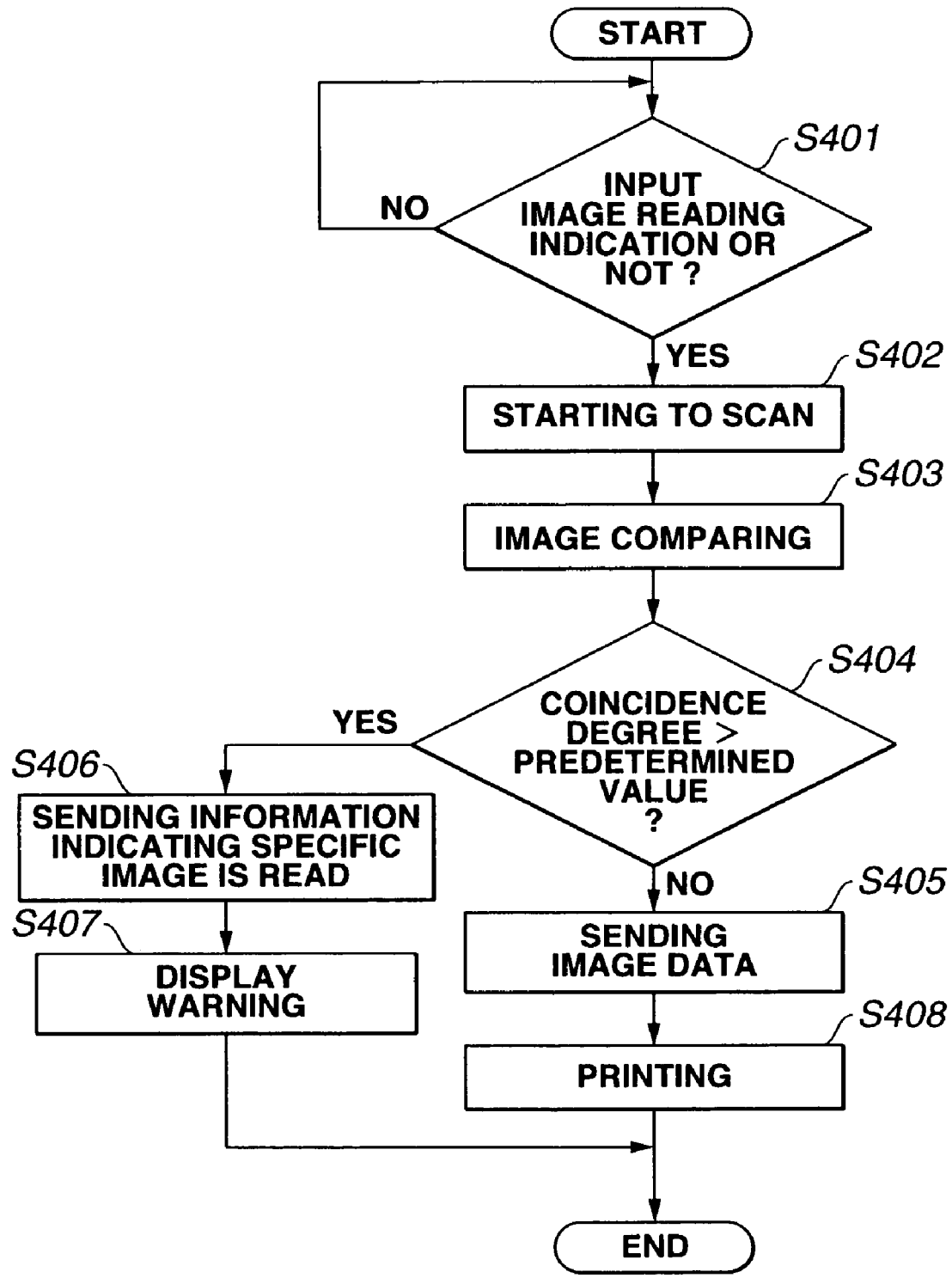
FIG. 7 is a flowchart that shows an example of the second control processing sequence of the image processing system.

FIG. 7 is a flowchart of process steps for a second control processing sequence of the image processing system of FIG. 1. Briefly, FIG. 7 shows a process in which scanner 101, having the forgery-preventing function (image comparing circuit 204 and specific image memory 205), scans an original image (document, photo, etc.) and a printer prints an image based on the original being sent to the printer via image data controller 100. Steps 401 to 406 are performed by running programs in ROM 305 or other storage medium (unshown) under the control of CPU 201 in FIG. 2. Steps 401, 407 and 408 are performed by running programs in ROM 207, hard disk 312 or other storage medium (unshown) under the control of CPU 301 in FIG. 3. Step 408 is performed by running programs in ROM 902 or other storage medium (unshown) under the control of CPU 901 in FIG. 4.

In more detail, an operator puts the original image on scanner 101 and inputs an image reading indication from image data controller(PC) 100. In step 401, image data controller(PC) 100 judges whether the operator inputs the image reading indication from keyboard 314 or an unshown pointing device or not. If the image reading indication is not input to image data controller 100, image data controller 100 stands by. If the image reading indication is input, scanner 101 starts to scan the original in step 402. In this case, since scanner 101 has the forgery-preventing function (image comparing circuit 204 and specific image memory 205), image data controller 100 permits use of a printer which the operator indicates without considering the existence of a forgery-preventing function in the printer based on the device map. That is, since scanner 101 includes a forgery-prevention function, forgery-detection is performed therein and image data controller(PC) 100 allows the user to send the image data to any printer of his choosing, regardless of whether or not the printer has a forgery-preventing function of its own.

Predetermined image processing is then performed to the image data scanned by CCD 202 of scanner 101 by image correction processing circuit 203 to obtain corrected image data. In step 403, image comparing circuit 204 compares the corrected image data with the specific image data stored in specific image memory 205. In step 404, the forgery-preventing function of scanner 101 judges whether a coincidence degree between the corrected image data and the specific image data is higher than a predetermined value or not. If the forgery-preventing function judges that the coincidence degree is higher than the predetermined value, in step 406 scanner 101 sends information to image data controller(PC) 100 indicating that the original image is the same as the specific image to image data controller 100. In step 407, image data controller(PC) 100 displays a warning as shown in FIG. 8 on display 311 based on the information. On the other hand, if the forgery-preventing function of scanner 101 judges that the coincidence degree is not higher than the predetermined value, scanner 101 sends the corrected image data to image data controller 100 in step 405. Alternatively, scanner 101 may directly send the corrected image data to a printer after scanner 101 sends the result of judgment to image data controller(PC) 100 and in response, receives a permission signal from image data controller(PC) 100 indicating that scanner 101 is to directly send the corrected image data to the printer. As stated above, since scanner 101 has the forgery-preventing function (image comparing circuit 204 and specific image memory 205), image data controller 100 permits use of a printer which the operator indicates without considering the existence of the forgery-preventing function in the printer. The printer then prints an image based on the corrected image data in step 408.

FIG. 8 shows an example of a warning displayed on display 311 of image controller 100 when a coincidence degree between the corrected image data and the specific image data in specific image memory 205 is higher than the predetermined value and as a result, the forgery-preventing function judges that the corrected image data is the same as the data of the specific image.

Figure 9:
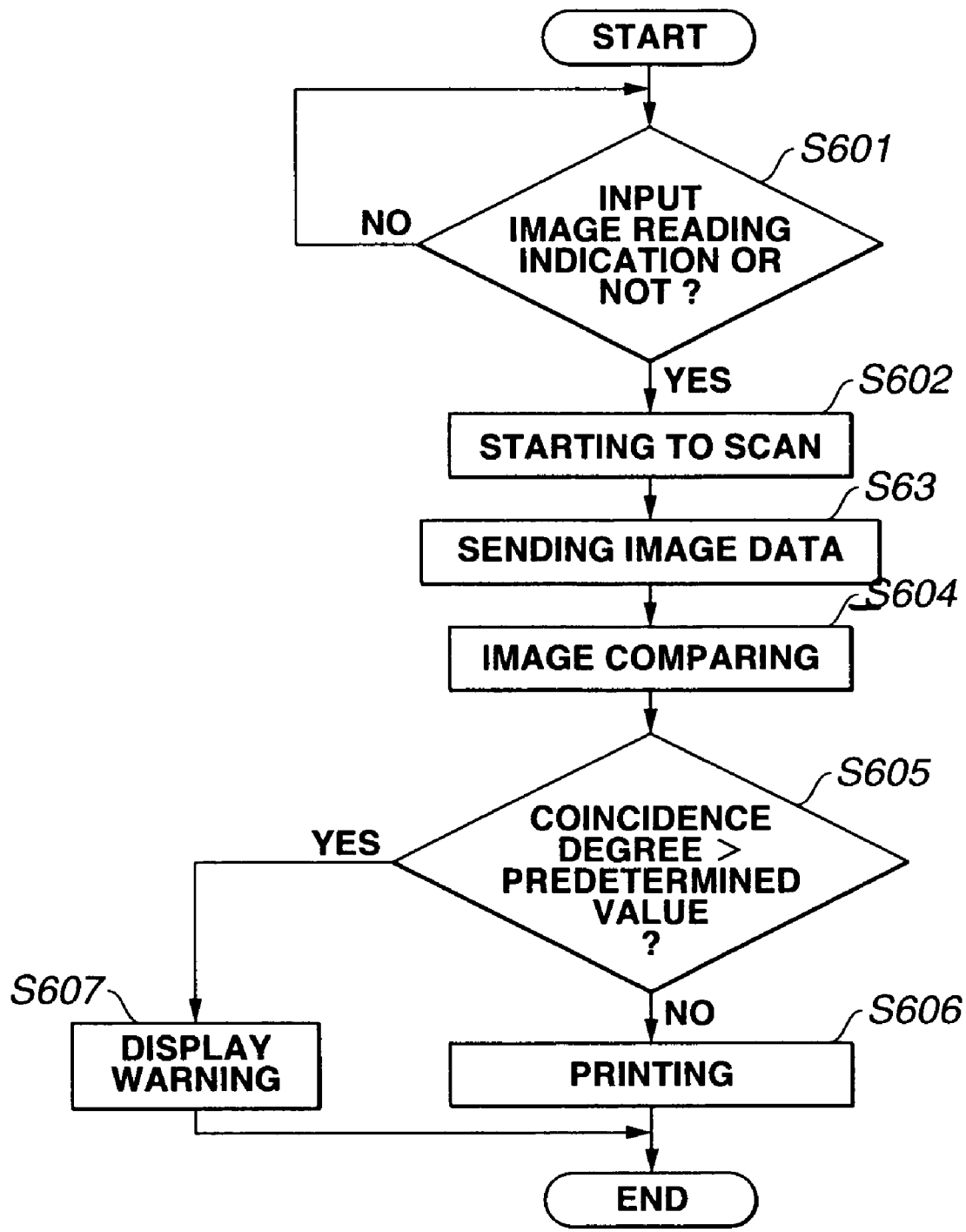
FIG. 9 is a flowchart that shows an example of the third control processing sequence of the image processing system.

FIG. 9 shows a flowchart of process steps for scanner 103 which does not have the forgery-preventing function and is an example of a third control processing sequence of the image processing system of FIG. 1. Briefly, FIG. 9 shows a process where scanner 103, not having the forgery-preventing function (image comparing circuit 913 and specific image memory 914), scans an original image and a printer prints an image based on the original being sent to the printer via image data controller 100. Steps 601 to 607 are performed by running programs in ROM 207 or other storage medium (unshown) under the control of CPU 201 in FIG. 2. Steps 601, 603 and 607 are performed by running programs in ROM 305, hard disk 312 or other storage medium (unshown) under the control of CPU 301 in FIG. 3. Steps 604 to 606 are performed by running programs in ROM 902 or other storage medium (unshown) under the control of CPU 901 in FIG. 4.

Figure 10:
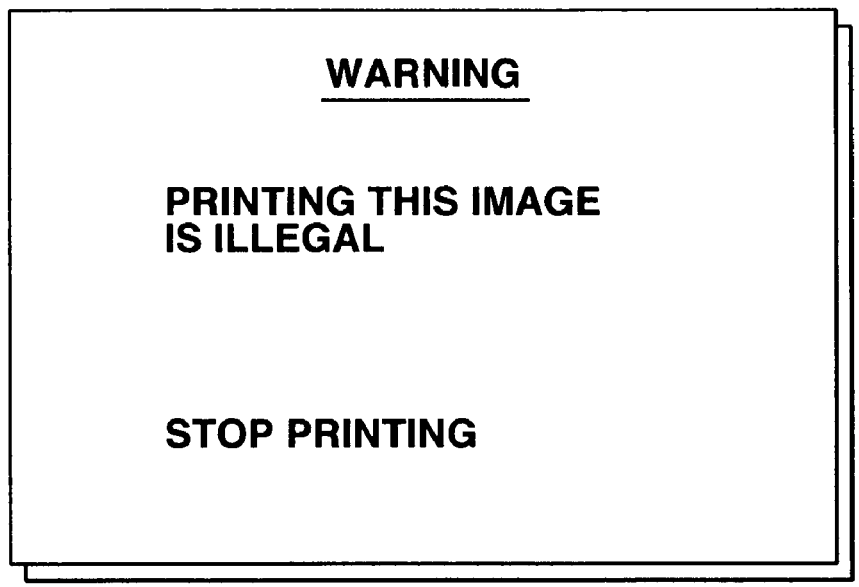
FIG. 10 is a drawing of showing the warning displayed on display 311 of image data controller 100 when a coincidence degree between the corrected image data and the specific image data in specific image memory 914 is higher than predetermined value.

In Step 601, image data controller 100 judges whether the operator inputs an image reading indication from keyboard 314 or an unshown pointing device or not. If the image reading indication is not input to image data controller 100, image data controller 100 stands by. If the image reading indication is input, scanner 103 starts to scan the original image in step 602 and sends image data based on the original image to image data controller 100. Since scanner 103 does not have the forgery-preventing function, image data controller 100 recognizes the need to select a printer or printers which have the forgery-preventing function for judging the image data. Printer 102 is selected in this embodiment. In step 603, image data controller 100 sends the image data received from scanner 103 to printer 102. The image data received via image data network 1001 is temporally stored in RAM 903 in printer 102. In step 604, image comparing circuit 913 compares the sent image data with specific image data stored in specific image memory 914 to determined if the degree of coincidence is higher than a predetermined value. If the forgery-preventing function in printer 102 judges that the coincidence degree is not higher than the predetermined value, in step 605, flow proceeds to step 606 and printer 102 prints the sent image data. If the forgery-preventing function in printer 102 judges that the coincidence degree is higher than the predetermined value, in step 605, the flow proceeds to step 606 and printer 102 sends information to image data controller(PC) 100 indicating that the original image is the same as the specific image data. In step 607, image data controller 100 displays a warning on display 311 as shown in FIG. 10 based on the information. In an alternative arrangement, scanner 103 may directly send the corrected image data to printer 102 on the basis of an indication from image data controller 100 as described above.

FIG. 10 is an example of the warning displayed on display 311 of image data controller 100 when a coincidence degree between the corrected image data and the specific image data in specific image memory 914 is higher than the predetermined value and the forgery-preventing function of printer 102 judges the corrected image data as being the same as the specific image.

As can readily be seen by the foregoing, the image processing system does not stop printing and prints image data based on an original image by using a printer having the forgery-preventing function if a scanner scanning the original image does not have the forgery-preventing function. As a result, the image processing system can always consider a judging result of the forgery-preventing and offers high productivity. In the image processing system comprising a plurality of scanners (scanners 101, 103) and printers (printers 102, 104), when one of the scanners scans an original image and one of the printers prints an image based on the original image (scan-print function), the image processing system can offer both high productivity and effect forgery-prevention at the same time by image data controller 100 controlling the selection of a printer for printing the scanned image data based on the existence of the forgery-preventing function in the scanner.

Second Embodiment

In the image processing system of FIG. 1 in the first embodiment comprising a plurality of scanners (scanners 101 and 103) and image printers (printers 102 and 104), when one of the scanners scans an original image and one of the printers prints an image based on the original image (scan-print function), image data controller(PC) 100 controls selection of a printer for printing the scanned image data based on the existence of the forgery-preventing function in the scanner. In the second embodiment, image data controller(PC) 100 changes a display condition for displaying scanners or printers on a display from which an operator can select.

Figure 11:
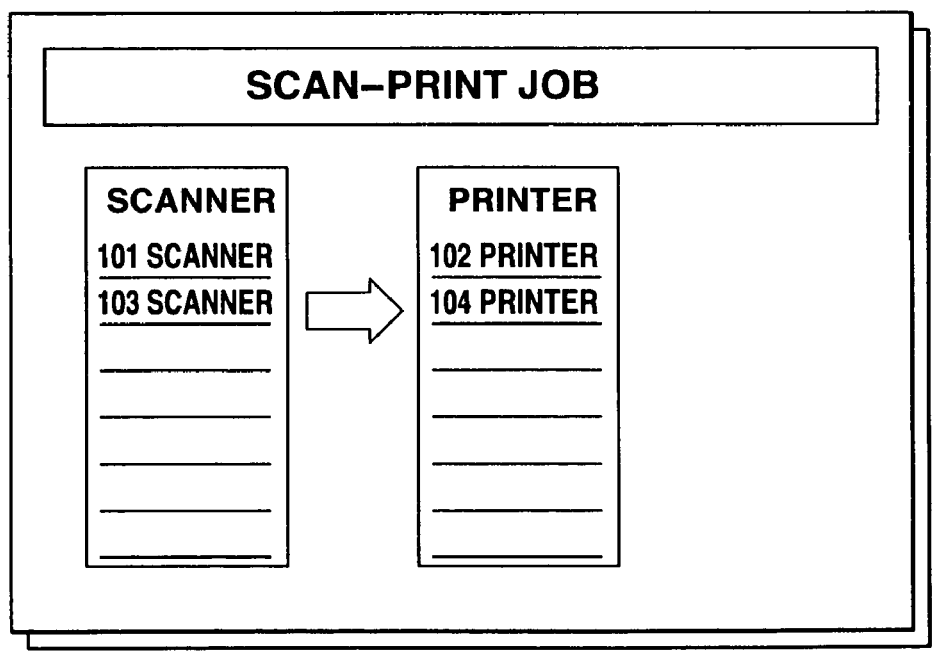
FIG. 11 is an example of a diagram of showing a selection display for scan-print job displayed on display 311 of image data controller 100.

FIG. 11 is an example of a diagram showing a selection display for a scan-print job displayed on display 311 of image data controller(PC) 100 and is an initial condition before an operator designates any scanners and printers to perform image processing. Image data controller(PC) 100 displays available device information based on a confirmation of scanners and printers connected to a network under the control of image data controller(PC) 100. An operator can select a scanner and a printer for performing a scan-print job by selecting "scanner 101" or "scanner 103" and "printer 102" or "printer 104" on display 311 from keyboard 314 in FIG. 3 or an unshown pointing device. In the first embodiment, for explaining operation of the image processing system easily, when the forgery-preventing function of each device is confirmed, image data controller(PC) 100 receives information indicating whether each device (scanner and printer) has the forgery-preventing function or not from the device. In practice however, the device information map is made from specification information (resolution, color or monochrome, bit length for each pixel, data format, job condition of each device and job information held by each device) received together with the information related to the forgery-preventing function. Image data controller(PC) 100 generates or rewrites the information map when image data controller(PC) 100 is turned on, when at least one of the devices is changed, when the devices receive a scanning or print indication from image controller 100, or when a new device is connected to the network. The specification information may be displayed on display 311. As a result, an operator of this system can select a preferable scanner or printer considering the specification information, and therefore, this system can offer both high productivity and effect forgery-prevention at the same time. It should be noted that although two scanners and two printers are described in this embodiment, the specification information is more effective in a system where more scanners and printers are connected to the network.

Figure 12:
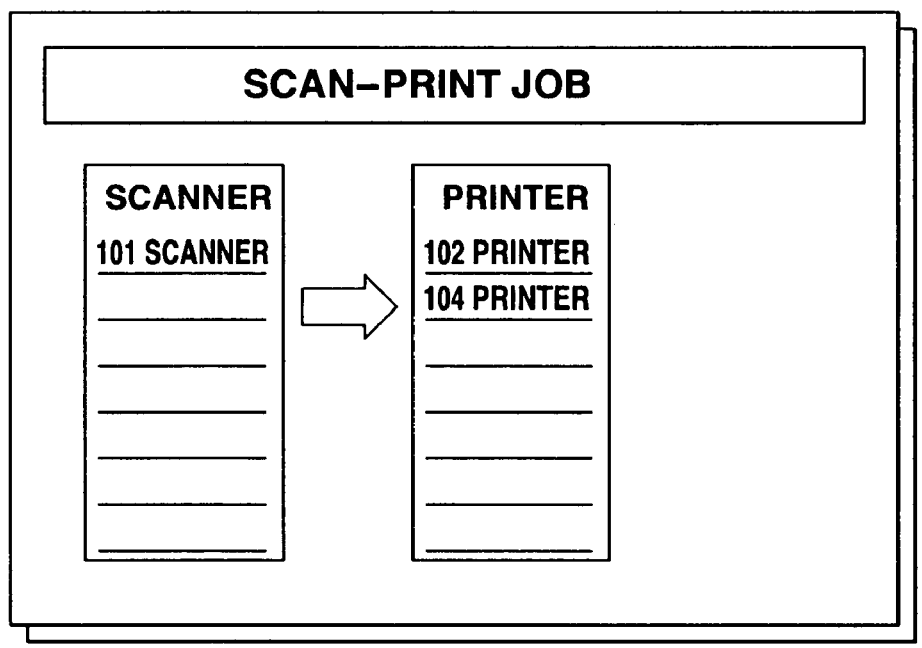
FIG. 12 is an example of a diagram of showing a selection display for scan-print job displayed on display 311 of image data controller 100.

The following is an explanation of a situation where scanner 101 is selected on a scan-print job selecting display by an operator with reference to FIG. 12. In FIG. 12, an example of a diagram showing the selection display for a scan-print job displayed on display 311 of image data controller(PC) 100 and where scanner 101 is selected are shown. When scanner 101 is selected on the selection display for the scan-print job, a display condition for scanner 103 is changed on the display. In this situation, the operator can not select scanner 103 on this display. Since image data controller 100 has information that scanner 101 has the forgery-preventing function (image comparing circuit 204 and specific image memory 205), image data controller 100 displays both printer 102 and printer 104 for selection as a printer that the operator can select for image printing. The specification information can also be displayed on display 311. As a result, the operator can select the most preferable scanner or printer considering the specification information. In this embodiment, two scanners and two printers are connected the network, but additional scanners and printers may be connected the network and the specification information is more effective when more scanners and printers are connected to the network.

Figure 13:
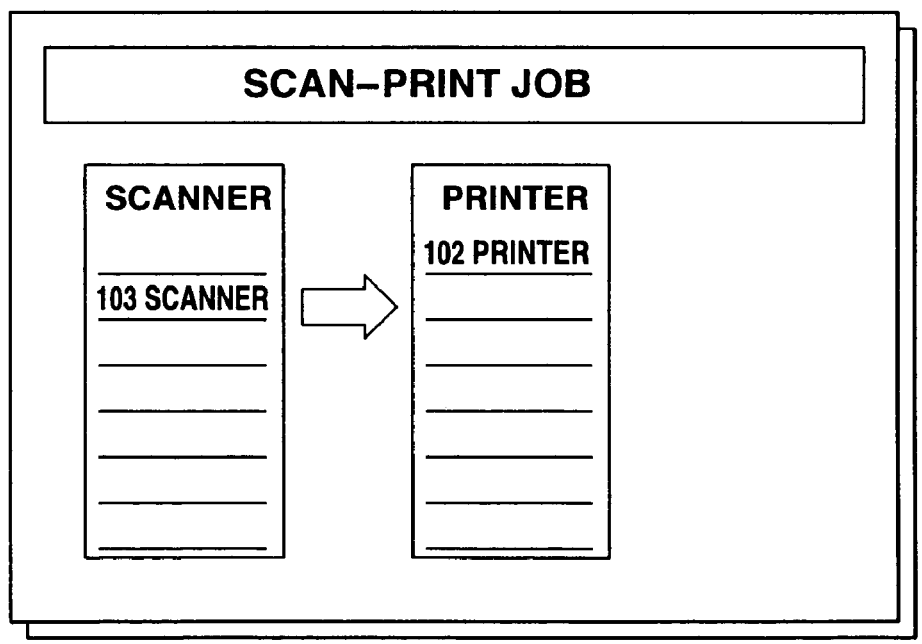
FIG. 13 is an example of a diagram of showing a selection display for scan-print job displayed on display 311 of image data controller 100.

FIG. 13 is an example of a diagram showing the selection display for a scan-print job displayed on display 311 of image data controller 100 and shows a case where scanner 103 is selected. When scanner 103 is selected on the selection display for a scan-print job, a display condition for scanner 101 is changed on the display. In this situation, the operator can not select scanner 101 on the display. Since image data controller 100 has information that scanner 103 does not have the forgery-preventing function (image comparing circuit 204 and specific image memory 205), image data controller 100 displays only printer 102 for selection as a printer that the operator can select for image printing based on the specification information.

Figure 14:
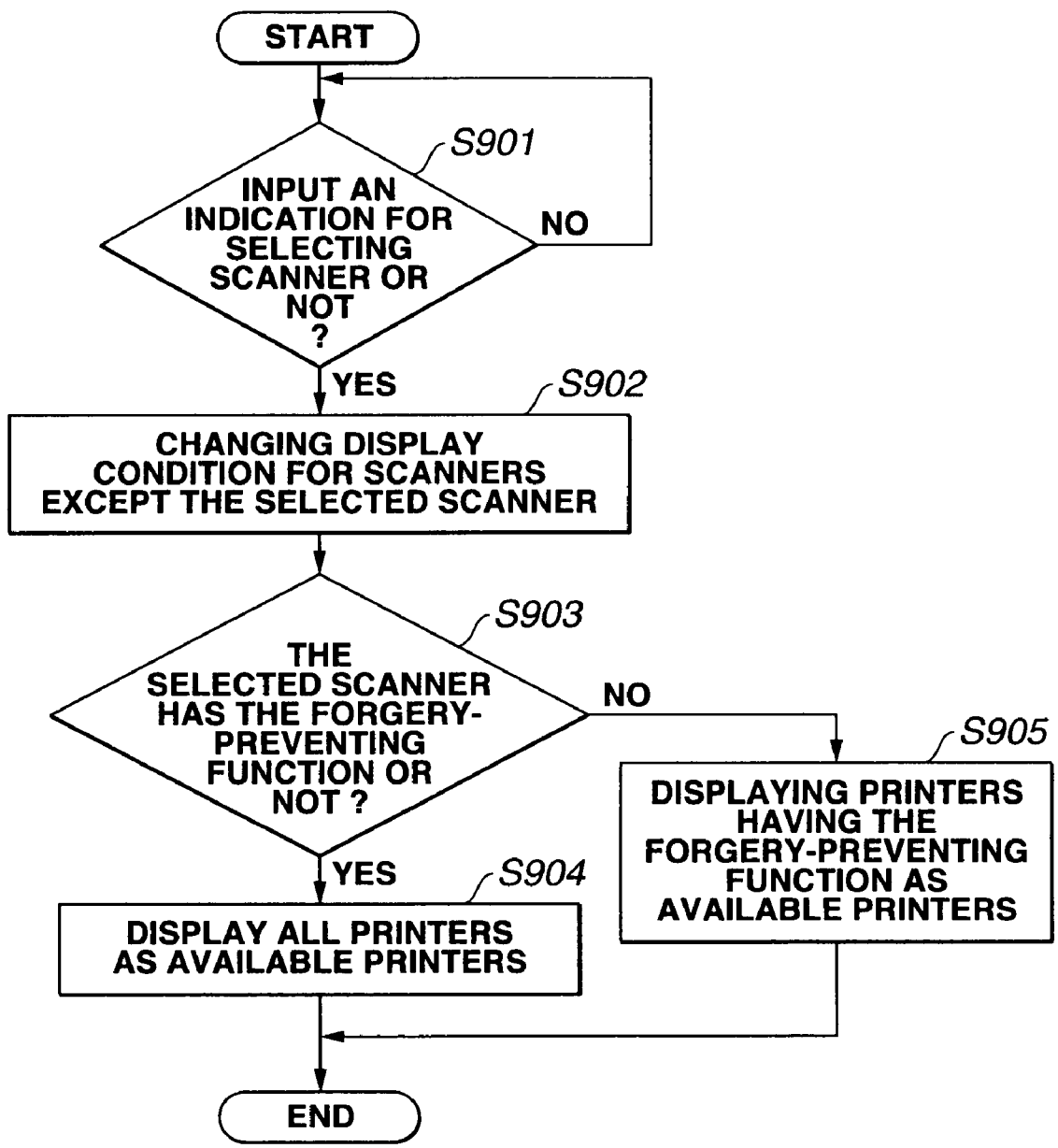
FIG. 14 is a flowchart that shows an example of the fourth control processing sequence of the image processing system.

The following is on explanation of a controlling sequence of the selection display for a scan-print job of the image processing system with reference to a flowchart of FIG. 14. FIG. 14 is a flowchart that shows an example of a fourth control processing sequence of the image processing system of FIG. 1 and a sequence of the selection display for a scan-print job. Steps 901 to 905 are performed by running programs in ROM 305, hard disk 312 or other storage medium (unshown) under the control of CPU 301 in FIG. 3.

At first, when the selection display for a scan-print job in FIG. 11 is displayed on display 311, in step 901 image data controller(PC) 100 judges whether the operator has input an indication to select a scanner on display 311 from keyboard 314 or an unshown pointing device. If the indication is not input, image data controller(PC) 100 stands by. If image data controller(PC) 100 judges that the selecting indication is input, in step 902 image data controller(PC) 100 changes a display condition for all scanners except the selected scanner on the display. In this situation, the operator can not select any scanners on this display other than the selected scanner. In step 903, image data controller(PC) 100 judges whether the selected scanner has the forgery-preventing function or not. If the selected scanner has the forgery-preventing function, image data controller(PC) 100 display all printers that the operator can select from for printing image data scanned by the selected scanner. On the other hand, if the selected scanner does not have the forgery-preventing function in step 903, flow proceeds to step 905 and image data controller 100 displays only those printers having the forgery-preventing function that the operator can select from for printing image data scanned by the selected scanner.

Since image data controller(PC) 100 changes the selection display for a scan-print job based on the existence of the forgery-preventing function for scanners and printers under the control of image data controller(PC) 100 and displays the scanners and printers that can be used, the image processing system offers a certain forgery-preventing function. As a result, the image processing system in a scan-print operation can offer both high productivity and effect forgery-prevention at the same time due to image data controller(PC) 100 is selection of a printer for printing a scanned image data based on the existence of the forgery-preventing function in the scanner.

The image processing system can perform forgery-prevention for image input from a color scanner and image output to a color printer. Particularly, the image processing system, including an image information processing apparatus, image reading apparatus' and image printing apparatus' and perform a color copy function using image data sent via a network, can offer a forgery-prevention function. It should be noted that printers 102 and 104 preferably print an image by electrical photo method, ink-jet method, thermal transfer method or dye sublimation method or any other print methods.

Furthermore, the processing described above can be implemented in a storage medium, storing program code of the procedure for implementing functions of each embodiment described above, to a system or an apparatus, and by the system or a computer (or CPU, or MPU) of an apparatus reading and executing the program code stored in the storage medium. In this case, the program code itself read from the storage medium implements the functions of each embodiment described above, and the storage medium storing the program code constitutes the present invention.

It is also possible to use ROM, a floppy disk, a hard disk, an optical disk, a magnet-optical disk, CD-ROM, CD-R, a magnetic tape, a nonvolatile memory card, or the like as a storage medium for storing the program code.

In addition, the present invention includes not only a case that the functions of each embodiment described above are implemented by a computer executing the program code that the computer reads, but also a case that the functions of each embodiment are implemented by such processing that an OS(operating system) or the like operating on the computer performs part of all of the actual processing. Furthermore, the present invention also includes a case that, after the program code read form a storage medium is written in memory provided in a feature expansion board inserted into a computer, or a feature expansion unit connected to the computer, a CPU or the like that is provided in the feature expansion board or the feature expansion unit performs part or all of the actual processing, and functions of each embodiment described above are implemented.

Furthermore, the image processing system may download the programs used in the first and second embodiments from a database(unshown) by using a communication program in the image processing system and may implement the programs like the first and second embodiments.

The invention may be embodied in the other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image processing apparatus comprising:
   first receiving means that receives information from a first scanning apparatus indicating the presence of a forgery-preventing function in the first scanning apparatus, and receiving information from a second scanning apparatus indicating the absence of a forgery-preventing function in the second scanning apparatus;
   second receiving means that receives information from a first printing apparatus indicating the presence of a forgery-preventing function in the first printing apparatus, and receiving information from a second printing apparatus indicating the absence of a forgery-preventing function in the second printing apparatus;
   generating means that generates a device information table on the basis of the information received by said first receiving means and the information received by the second receiving means; and
   controlling means that controls which printing apparatus is to print image data received from one of the first or second scanning apparatuses based on the device information table generated by the generating means,
   wherein the first receiving means and the second receiving means receive information indicative of the presence or absence of a forgery-preventing function when at least one of the first and second scanning apparatuses and the first and second printing apparatuses is changed.

2. An image processing apparatus according to claim 1, wherein said controlling means sends image data received from the second scanning apparatus, which does not have a forgery-preventing function, to the first printing apparatus, which does have a forgery-preventing function.

3. An image processing apparatus according to claim 1, further comprising notifying means that notifies a user by a warning when the forgery-preventing function of the first scanning apparatus and the forgery-preventing function of the first printing apparatus judges that the image data is data of a specific image.

4. An image processing apparatus according to claim 3, wherein the data of the specific image is information expressing a specific pattern or a digital water mark.

5. An image processing apparatus according to claim 1, wherein the first receiving means and the second receiving means receive the information from the first and second scanning apparatuses and from the first and second printing apparatuses when the image processing apparatus turns on.

6. An image processing apparatus according to claim 1, wherein the first receiving means and the second receiving means receive the information from the first and second scanning apparatuses when the first and second scanning apparatuses receive a scanning indication, or the first and second printing apparatuses receive a printing indication, from the image processing apparatus.

7. An image processing apparatus according to claim 1, wherein the first receiving means and the second receiving means receive information indicative of the presence or absence of a forgery-preventing function when a new scanning apparatus or a new printing apparatus is connected to the image processing apparatus via a network.

8. An image processing apparatus according to claim 1, wherein the controlling means sends the image data received from the first scanning apparatus, which has a forgery-preventing function, to one of the first or second printing apparatuses according to a selection by an operator of the image processing apparatus.

9. An image processing apparatus according to claim 1, wherein the controlling means sends a permission signal to the first scanning apparatus permitting the first scanning apparatus, which has a forgery-preventing function, to send image data directly to one of the first or second printing apparatuses as selected by an operator, if the forgery-preventing function of the first scanning apparatus judges the image data as data of a specific image.

10. An image processing apparatus, comprising:
first receiving means that receives information from a first scanning apparatus indicating the presence of a forgery-preventing function in the first scanning apparatus, and receiving information from a second scanning apparatus indicating the absence of a forgery-preventing function in the second scanning apparatus;
second receiving means that receives information from a first printing apparatus indicating the presence of a forgery-preventing function in the first printing apparatus, and receiving information from a second printing apparatus indicating the absence of a forgery-preventing function in the second printing apparatus;
generating means that generates a device information table on the basis of the information received by the first receiving means and the information received by the second receiving means;
inputting means that inputs information related to a selected scanning apparatus for image scanning; and
notifying means that notifies a user, based on the information received by the first receiving means, the information received by the second receiving means, information stored in the device information table, and the information input by the input means, of at least one available printing apparatus for which image data can be sent to for printing,
wherein the first receiving means and the second receiving means receive information indicative of the presence or absence of a forgery-preventing function when at least one of the first and second scanning apparatuses and the first and second printing apparatuses is changed.

11. An image processing apparatus according to claim 10, wherein the notifying means notifies the user that the first printing apparatus, which has a forgery-preventing function, is an available printing apparatus if the selected scanning apparatus is the second scanning apparatus, which does not have a forgery-preventing function.

12. An image processing apparatus according to claim 10, wherein the notifying means notifies the user that the first printing apparatus, which has a forgery-preventing function, and the second printing apparatus, which does not have a forgery-preventing function, are available printing apparatuses if the selected scanning apparatus is the first scanning apparatus, which has a forgery-preventing function.

13. An image processing apparatus according to claim 10 further comprising warning means that warns a user when the forgery-preventing function of the first scanning apparatus and a forgery-preventing function of the first printing apparatus judges forgery.

14. An image processing apparatus according to claim 13, wherein the forgery-preventing function of the first scanning apparatus and the forgery-preventing function of the first printing apparatus judges a forgery based on a specific pattern or a digital water mark.

15. An image processing apparatus according to claim 10, wherein the first receiving means receives the information from the first and second scanning apparatuses and the second receiving means receives the information from the first and second printing apparatuses when the image processing apparatus turns on.

16. An image processing apparatus according to claim 10, wherein the first receiving means receives the information from the first and second scanning apparatuses and the second receiving means receives the information from the first and second printing apparatuses when the first or second scanning apparatuses or the first or second printing apparatuses receive a scanning or printing indication from the image processing apparatus.

17. An image processing apparatus according to claim 10, wherein the first receiving means and the second receiving means receive information indicative of the presence or absence of a forgery-preventing function when a new scanning apparatus or a new printing apparatus is connected to the image processing apparatus via a network.

18. An image processing apparatus according to claim 10, wherein the first receiving means and the second receiving means receive specification information from the first and second scanning apparatuses and the first and second printing apparatuses.

19. An image processing apparatus according to claim 18, wherein the notifying means further notifies the user of the specification information for the user to select a preferable scanning apparatus and printing apparatus.

20. An image processing method, comprising:
a first receiving step of receiving information from a first scanning apparatus indicating the presence of a forgery-preventing function in the first scanning apparatus, and receiving information from a second scanning apparatus indicating the absence of a forgery-preventing function in the second scanning apparatus;
a second receiving step of receiving information from a first printing apparatus indicating the presence of a forgery-preventing function in the first printing apparatus, and receiving information from a second printing apparatus indicating the absence of a forgery-preventing function in the second printing apparatus;
generating a device information table on the basis of the information received in the first receiving step and the information received in the second receiving step; and
controlling which printer is to print image data received from one of the first and second scanning apparatuses based on the device information table generated by the generating step,
wherein the first receiving step and the second receiving step receive information indicative of the presence or absence of a forgery-preventing function when at least one of the first and second scanning apparatuses and the first and second printing apparatuses is changed.

21. A computer readable program stored on a computer readable medium, said program comprising:
code for receiving information from a first scanning apparatus indicating the presence of a forgery-preventing function in the first scanning apparatus, and receiving information from a second scanning apparatus indicating the absence of a forgery-preventing function in the second scanning apparatus;
code for receiving information from a first printing apparatus indicating the presence of a forgery-preventing function in the first printing apparatus, and receiving information from a second printing apparatus indicating the absence of a forgery-preventing function in the second printing apparatus;

code for generating a device information table on the basis of the information received by the first receiving step and the information received by the second receiving step; and code for controlling which printer is to print image data received from one of the first and second scanning apparatuses based on the device information table generating by the generating step, wherein the first receiving step and the second receiving step receive information indicative of the presence or absence of a forgery-preventing function when at least one of the first and second scanning apparatuses and the first and second printing apparatuses is changed.

22. An image processing method, comprising:

a first receiving step of receiving information from a first scanning apparatus indicating the presence of a forgery-preventing function in the first scanning apparatus, and receiving information from a second scanning apparatus indicating the absence of a forgery-preventing function in the scanning apparatus;

a second receiving step of receiving information from a first printing apparatus indicating the presence of a forgery-preventing function in the first printing apparatus, and receiving information from a second printing apparatus indicating the absence of a forgery-preventing function in the second printing apparatus;

generating a device information table on the basis of the information received in the first receiving step and the information received in the second receiving step;

inputting information related to a selected scanning apparatus for image scanning; and notifying a user, based on the information received by the first receiving step, the information received by the second receiving step, information stored in the device information table, and the information input in the input step, of at least one available printing apparatus for which image data can be sent to for printing, wherein the first receiving step and the second receiving step receive information indicative of a forgery-preventing function when at least one of the first and second scanning apparatuses and the first and second printing apparatuses is changed.

23. A computer readable program stored on a computer readable medium, said program comprising:

code for a first receiving step of receiving information from a first scanning apparatus indicating the presence of a forgery-preventing function in the first scanning apparatus, and receiving information from a second scanning apparatus indicating the absence of a forgery-preventing function in the scanning apparatus;

code for a second receiving step of receiving information from a first printing apparatus indicating the presence of a forgery-preventing function in the first printing apparatus, and receiving information from a second printing apparatus indicating the absence of a forgery-preventing function in the second printing apparatus;

code for a generating a device information table on the basis of the information received by the first receiving step and the information received by the second receiving step;

code for inputting information related to a selected scanning apparatus for image scanning; and code for notifying a user, based on the information received by the first receiving step, the information received by the second receiving step, the information stored in the device table, and the information input in the input step, of at least one available printing apparatus for which image data can be sent to for printing, wherein the first receiving step and the second receiving step receive information indicative of a forgery-preventing function when at least one of the first and second scanning apparatuses and the first and second printing apparatuses is changed.

24. An image processing apparatus, comprising:

an interface unit arranged to receive information from a first scanning apparatus indicating the presence of a forgery-preventing function in the first scanning apparatus, to receive information from a second scanning apparatus indicating the absence of a forgery-preventing function in the second scanning apparatus, to receive information from a first printing apparatus indicating the presence of a forgery-preventing function in the first printing apparatus, and to receive information from a second printing apparatus indicating the absence of a forgery-preventing function in the second printing apparatus;

a generating unit arranged to generate a device information table on the basis of the information on the first and second scanning apparatuses and the information on the first and second printing apparatuses received by the interface unit; and a processor unit arranged to control which printing apparatus is to print image data received from one of the first and second scanning apparatuses based on the device information table generated by the generating unit, wherein the interface unit receives information indicative of the presence or absence of a forgery-preventing function when at least one of the first and second scanning apparatuses and the first and second printing apparatuses is changed.

25. An image processing apparatus according to claim 24, wherein said processing unit sends image data received from the second scanning apparatus, which does not have a forgery-preventing function, to the first printing apparatus, which does have a forgery-preventing function.

26. An image processing apparatus according to claim 24 further comprising a display unit arranged to display a warning when the forgery-preventing function of the first scanning apparatus and a forgery-preventing function of the first printing apparatus judges image data as data of a specific image.

27. An image processing apparatus according to claim 26, wherein the data of a specific image is information expressing a specific pattern or a digital water mark.

28. An image processing apparatus according to claim 24, wherein the interface unit is arranged to receive the information from the first scanning apparatus, the second scanning apparatus, the first printing apparatus, and the second printing apparatus, when the image processing apparatus turns on.

29. An image processing apparatus according to claim 24, wherein the interface unit is arranged to receive the information from the first scanning apparatus, the second scanning apparatus, the first printing apparatus, and the second printing apparatus, when the first or second scanning apparatuses or the first or second printing apparatuses receive a scanning or printing indication from the image processing apparatus.

30. An image processing apparatus according to claim 24, wherein the interface unit is arranged to receive information indicative of the presence or absence of a forgery-preventing function when a new scanning apparatus or a new printing apparatus is connected to the image processing apparatus via a network.

31. An image processing apparatus according to claim 24, wherein the processor unit is arranged to send the image data received from the first scanning apparatus, which has a forgery-preventing function, to one of the first or second printing apparatuses as selected by an operator of the image processing apparatus.

32. An image processing apparatus according to claim 24, wherein the processing unit is arranged to send a permission signal to the first scanning apparatus permitting the first scanning apparatus to send image data directly to a printing apparatus selected by an operator, if the forgery-preventing function in the first scanning apparatus judges the image data as data of a specific image.

33. An image processing apparatus, comprising:
an interface unit arranged to receive information from a first scanning apparatus indicating the presence of a forgery-preventing function in the first scanning apparatus, to receive information from a second scanning apparatus indicating the absence of a forgery-preventing function in the second scanning apparatus, to receive information from a first printing apparatus indicating the presence of a forgery-preventing function in the first printing apparatus, and to receive information from a second printing apparatus indicating the absence of a forgery-preventing function in the second printing apparatus;
a generating unit arranged to generate a device information table on the basis of the information on the first and second scanning apparatuses and the information on the first and second printing apparatuses received by the interface unit;
a pointing unit arranged to indicate information related to a selected scanning apparatus for image scanning; and
a display unit arranged to display, based on the information received by the interface unit, information stored in the device information table, and the information indicated by the pointing unit, at least one available printing apparatus for which image data can be sent to for printing,
wherein the interface unit receives information indicative of the presence or absence of a forgery-preventing function when at least one of the first and second scanning apparatuses and the first and second printing apparatuses is changed.

34. An image processing apparatus according to claim 33, wherein the display unit is arranged to display the first printing apparatus, which has a forgery-preventing function, as the available printing apparatus if the selected scanning apparatus is the second scanning apparatus, which does not have a forgery-preventing function.

35. An image processing apparatus according to claim 33, wherein the display unit is arranged to display the first printing apparatus, which has a forgery-preventing function, and the second printing apparatus, which does not have a forgery-preventing function, as the available printing apparatus if the selected scanning apparatus is the first scanning apparatus, which has a forgery-preventing function.

36. An image processing apparatus according to claim 33, wherein the display unit is arranged to display a warning when the forgery-preventing function of the first scanning apparatus and the forgery-preventing function of the first printing apparatus judges a forgery.

37. An image processing apparatus according to claim 36, wherein the forgery-preventing function of the first scanning apparatus and the forgery-preventing function of the first printing apparatus judges a forgery based on a specific pattern or a digital water mark.

38. An image processing apparatus according to claim 33, wherein the interface unit is arranged to receive the information from the first scanning apparatus, the second scanning apparatus, the first printing apparatus, and the second printing apparatus, when the image processing apparatus is turned on.

39. An image processing apparatus according to claim 33, wherein the interface unit is arranged to receive the information from the first scanning apparatus, the second scanning apparatus, the first printing apparatus, and the second printing apparatus, when one of the first or second scanning apparatuses or the first or second printing apparatuses receive a scanning or printing indication from the image processing apparatus.

40. An image processing apparatus according to claim 33, wherein the interface unit is arranged to receive information indicative of the presence or absence of a forgery-preventing function when a new scanning apparatus or a new printing apparatus is connected to the image processing apparatus via a network.

41. An image processing apparatus according to claim 33, wherein the interface unit is arranged to receive specification information from the first and second scanning apparatuses and the first and second printing apparatuses.

42. An image processing apparatus according to claim 41, wherein the display unit is arranged to display the specification information for an operator to select a preferable scanning apparatus and printing apparatus.

43. An image processing apparatus that communicates with one or more image reading devices and one or more image output devices, comprising:
first receiving means that receives information indicating whether or not a device has a forgery-preventing function from each of the one or more image reading devices and each of the one or more image output devices;
generating means for generating a device information table on the basis of the information on the one or more image reading devices and the information on the one or more image output devices received by the first receiving means;
second receiving means that receives image data read by one of the one or more image reading devices;
judging means that judges whether or not the image reading device that reads the image data includes a forgery-preventing function from the forgery-preventing function information of the image reading device received by the first receiving means; and
controlling means that controls which of the one or more image output devices the image data received by the second receiving means is to be output to in order to output the image data to an appropriate image output device based on a judged result of the judging means and the device information table generated by the generating means,
wherein the first receiving means receives the information indicating whether or not the device has the forgery-preventing function when at least one of the image reading devices and at least one of the image output devices is changed.

44. An image processing apparatus according to claim 43, wherein said controlling means outputs the image data to an output device that includes a forgery-preventing function if the image reading device that read the image data does not include a forgery-preventing function.

45. An image processing apparatus according to claim 43 further comprising notifying means that notifies a user by a warning when the forgery-preventing function of an image reading device or an image output device judges the image data is data of a specific image.

46. An image processing apparatus according to claim 45, wherein the data of the specific image is information expressing a specific pattern or a digital water mark.

47. An image processing apparatus according to claim 43, wherein the first receiving means receives the information indicating whether or not the device has the forgery-preventing function when the image processing apparatus is turned on.

48. An image processing apparatus according to claim 43, wherein the first receiving means receives the information indicating whether or not the device has the forgery-preventing function when at least one of the image reading devices or at least one of the image output devices receives a reading or an image output indication from the image processing apparatus.

49. An image processing apparatus according to claim 43, wherein the first receiving means receives the information indicating whether or not the device has the forgery-preventing function when a new image reading device or a new image output device is connected to the image processing apparatus via a network.

50. An image processing apparatus according to claim 43, wherein the controlling means outputs the image data to an output device selected by an operator of the image processing apparatus if the image reading device that read the image data includes a forgery-preventing function.

51. An image processing method for an image processing apparatus that communicates with one or more image reading devices and one or more image output devices, comprising:

a first receiving step of receiving information indicating whether or not a device has a forgery-preventing function from each of the one or more image reading devices and each of the one or more image output devices;

a generating step of generating a device information table on the basis of the information on the one or more image reading devices and the information on the one or more image output devices received by the first receiving step;

a second receiving step of receiving image data read by one of the one or more image reading devices;

judging whether or not the image reading device that reads the image data includes a forgery-preventing function from the forgery-preventing function information of the image reading device received in the first receiving step; and controlling which of the one or more image output devices the image data received in the second receiving step is to be output to in order to output the image data to an appropriate image output device based on a judged result of the judging step and the device information table generated in the generating step, wherein the first receiving step receives the information indicating whether or not the device has the forgery-preventing function when at least one of the image reading devices and at least one of the image output devices is changed.

\* \* \* \* \*

UNITED STATES PATENT AND TRADEMARK OFFICE
CERTIFICATE OF CORRECTION

PATENT NO. : 7,224,818 B2  Page 1 of 1
APPLICATION NO. : 09/915421
DATED : May 29, 2007
INVENTOR(S) : Miyamoto It is certified that error appears in the above-identified patent and that said Letters Patent is hereby corrected as shown below:

COLUMN 1:
Line 28, "printers" should read -- printers that --;
Line 30, "printers" should read -- printers that --; and
Line 31, "printers" should read -- printers that --.

COLUMN 3:
Line 33, "comprise" should read -- comprising --; and
Line 46, "showing" should read -- shows --.

COLUMN 4:
Line 36, "coverts" should read -- converts --.

COLUMN 8:
Line 44, "temporally" should read -- temporarily --; and
Line 47, "determined" should read -- determine --.

COLUMN 10:
Line 25, "connected" should read -- connected to --;
Line 26, "connected" should read -- connected to --;
Line 42, "on" should read -- an --; and
Line 65, "display" should read -- displays --.

COLUMN 11:
Line 51, "form" should read -- from --.

Signed and Sealed this

Twenty-seventh Day of May, 2008

JON W. DUDAS
*Director of the United States Patent and Trademark Office*